United States Patent
Coleman et al.

(10) Patent No.: US 6,782,141 B1
(45) Date of Patent: Aug. 24, 2004

(54) ORDERING A PLURALITY OF OBJECTS

(75) Inventors: Nicolas Leslie Coleman, Sydney (AU); Oliver Bock, Sydney (AU); Marija Herceg, Lindfield (AU); Scott T. Newham, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/566,089

(22) Filed: May 9, 2000

(30) Foreign Application Priority Data

May 10, 1999 (AU) .............................................. PQ0279
May 10, 1999 (AU) .............................................. PQ0281

(51) Int. Cl.[7] .............................................. G06K 9/00
(52) U.S. Cl. ...................................... 382/291; 715/517
(58) Field of Search ............................... 382/100, 284, 382/286, 291, 293, 294, 305; 345/629, 634, 637; 715/517, 523, 524

(56) References Cited

U.S. PATENT DOCUMENTS

| | | | | |
|---|---|---|---|---|
| 4,829,446 A | * | 5/1989 | Draney | ........................ 364/488 |
| 4,888,648 A | | 12/1989 | Takeuchi et al. | ............. 358/335 |
| 5,808,616 A | * | 9/1998 | Shimizu | ...................... 345/419 |
| 5,940,121 A | | 8/1999 | Mcintyre et al. | .............. 348/64 |
| 6,596,032 B2 | * | 7/2003 | Nojima et al. | ............... 715/517 |
| 6,636,650 B1 | * | 10/2003 | Long et al. | .................. 382/295 |
| 2002/0040375 A1 | * | 4/2002 | Simon et al. | ................ 707/517 |

FOREIGN PATENT DOCUMENTS

EP 0 949 804 A2 10/1999 ............ H04N/1/21

* cited by examiner

*Primary Examiner*—Andrew W. Johns
(74) *Attorney, Agent, or Firm*—Fitzpatrick, Cella, Harper & Scinto

(57) ABSTRACT

The method comprises a first determining step 104, a measuring step 110, a second determining step 112, and a re-ordering step 114. In the first determining step 104, the method determines a line between adjacent center points of the original images. In the measuring step 110, the method measures, for each line, the shortest distance from the insertion point of the new image inserted on the page to said line. In the second determining step 112, the method determines the minimum of the shortest distances. Finally, in the re-ordering step 114, the method re-orders the one-dimensional list by inserting the new image in the list of original images at that position in the list corresponding to the line having the minimum shortest distance.

33 Claims, 9 Drawing Sheets

ORDERING A PLURALITY OF OBJECTS

FIELD OF INVENTION

The field of the present invention relates generally to the ordering of a plurality of objects in a space, such as the ordering of images or photographs on a page.

BACKGROUND OF INVENTION

Electronic photo-albums have become increasingly popular in recent times. These electronic photo-albums typically take the form of a collection of images stored using a non-volatile memory device, from which a user can retrieve the image for displaying on a display device. Usually, the images are gathered in digital form, and may, for example, be scanned by an electronic scanner, down-loaded from the Internet or produced by a digital camera. A collection of these images can be stored electronically to create an electronic photo-album, analogous to the traditional family photo-album, which uses photographic prints.

Presently, electronic photo-albums take the form of a collection of images, a user of the album being able to associate a caption or brief description with each image. For example, a user can collect a series of family photographs of a wedding, whether from a digital video or still camera, and associate a caption such as a date and a brief description of the event with each image. If desired, an electronic photo-album can be reproduced from the memory device by a high quality output device, such as a high-resolution colour printer, to produce an album substantially similar to a conventional photo-album.

The images of electronic photo-albums are typically ordered and represented in the order in which they are added. These electronic photo-albums suffer from the disadvantage that this ordering does not necessarily match an order desired by people. These electronic photo-albums also suffer from the disadvantage that this ordering may not meet the desires or cultural bias of the user.

SUMMARY OF THE INVENTION

It is an object of the present invention to ameliorate one or more disadvantages of the prior art.

According to a first aspect of the invention, there is provided a method of re-ordering a one-dimensional list of a number of original objects arranged in a space, upon the insertion of a new object in the space, the method comprising: (i) determining, for each adjacent original object if any, a corresponding line between points of the adjacent original objects; (ii) measuring, for each said line, the shortest distance from an insertion point of the new object to the said line; (iii) determining the minimum of the shortest distances; and (iv) re-ordering said one-dimensional list by inserting the new object in said list of original objects at that position in the list corresponding to that line having the minimum shortest distance.

According to a second aspect of the invention, there is provided a method of re-ordering a one-dimensional list of a number of original images arranged two-dimensionally on a page, upon the insertion of a new image on the page, the method comprising: (i) determining, for each adjacent original images if any, a corresponding line between points of the adjacent original images; (ii) determining a corresponding line between a first boundary point of the page and a said point of the first original image on the page; (iii) determining a corresponding line between a second boundary point of the page and a said point of the last original image on the page; (iv) measuring, for each said line, the shortest distance from an insertion point of the new image on the page to the said line; (v) determining the minimum of the shortest distances; and (vi) re-ordering said one-dimensional list by inserting the new image in said list of original images at that position in the list corresponding to that line having the minimum shortest distance.

According to a third aspect of the invention, there is provided an apparatus for re-ordering a one-dimensional list of a number of original objects arranged in a space, upon the insertion of a new object in the space, the apparatus comprising: means for determining, for each adjacent original object if any, a corresponding line between points of the adjacent original objects; means for measuring, for each said line, the shortest distance from an insertion point of the new object to the said line; means for determining the minimum of the shortest distances; and means for re-ordering said one dimensional list by inserting the new object in said list of original objects at that position in the list corresponding to that line having the minimum shortest distance.

According to a fourth aspect of the invention, there is provided an apparatus for re-ordering a one-dimensional list of a number of original images arranged two-dimensionally on a page upon the insertion of a new image on the page, the apparatus comprising: means for determining, for each adjacent original images if any, a corresponding line between points of the adjacent original images; means for determining a corresponding line between a first boundary point of the page and the centre point of the first original image on the page; means for determining a corresponding line between a second boundary point and the centre point of the last original image on the page; means for measuring, for each said line, the shortest distance from an insertion point of the new image on the page to the said line; means for determining the minimum of the shortest distances; and means for reordering said one-dimensional list by inserting the new image in said list of original images at that position in the list corresponding to that line having the minimum shortest distance.

According to a fifth aspect of the invention, there is provided a computer program product including a computer readable medium having recorded thereon a computer program for re-ordering a one-dimensional list of a number of original objects arranged in a space, upon the insertion of a new object in the space, the computer program product comprising: means for determining, for each adjacent original object if any, a corresponding line between points of the adjacent original objects; means for measuring, for each said line, the shortest distance from an insertion point of the new object to the said line; means for determining the minimum of the shortest distances; and means for re-ordering said one-dimensional list by inserting the new object in said list of original objects at that position in the list corresponding to that line having the minimum shortest distance.

According to a sixth aspect of the invention, there is provided a computer program product including a computer readable medium having recorded thereon a computer program for re-ordering a one-dimensional list of a number of original images arranged two-dimensionally on a page upon the insertion of a new image on the page, the computer program product comprising: means for determining, for each adjacent original images if any, a corresponding line between points of the adjacent original images; means for determining a corresponding line between a first boundary point of the page and the centre point of the first original image on the page; means for determining a corresponding line between a second boundary point and the centre point of the last original image on the page; means for measuring, for each said line, the shortest distance from an insertion point of the new image on the page to the said line; means for determining the minimum of the shortest distances; and means for re-ordering said one-dimensional list by inserting the new image in said list of original images at that position in the list corresponding to that line having the minimum shortest distance.

According to a seventh aspect of the invention, there is provided a method of determining a one-dimensional order of a plurality of objects arranged N-dimensionally, where N is greater than or equal to 2 and the method comprises the following steps: measuring, for each said object, the shortest distance from a predetermined point of the object to a predetermined N−1 dimensional surface; and determining a one-dimensional order of said objects according to the measured shortest distances.

According to a eighth aspect of the invention, there is provided a method of forming a one-dimensional list of a plurality of images arranged two-dimensionally on a page, the method comprising the following steps of: selecting a substantially linear line according to user input; measuring, for each said image, the shortest distance from a predetermined point of the image to the substantially linear line; and arranging the images in a one-dimensional list according to the measured shortest distances.

According to a ninth aspect of the invention, there is provided an apparatus for determining a one-dimensional order of a plurality of objects arranged two-dimensionally, the apparatus comprising: means for measuring, for each said object, the shortest distance from a predetermined point of the object to a predetermined line; and means for determining a one-dimensional order of said objects according to the measured shortest distances.

According to a tenth aspect of the invention, there is provided an apparatus for forming a one-dimensional list of a plurality of images arranged two-dimensionally on a page, the apparatus comprising: means for selecting a substantially linear line according to user input; means for measuring, for each said image, the shortest distance from a predetermined point of the image to the substantially linear line; and means for arranging the images in a one-dimensional list according to the measured shortest distances.

According to a eleventh aspect of the invention, there is provided a computer program product including a computer readable medium having recorded thereon a computer program for determining a one-dimensional order of a plurality of objects arranged two-dimensionally, the computer program product comprising: means for measuring, for each said object, the shortest distance from a predetermined point of the object to a predetermined line; and means for determining a one-dimensional order of said objects according to the measured shortest distances.

According to a twelfth aspect of the invention, there is provided a computer program product including a computer readable medium having recorded thereon a computer program for forming a one-dimensional list of a plurality of images arranged two-dimensionally on a page, the computer program product comprising: means for selecting a substantially linear line according to user input; means for measuring, for each said image, the shortest distance from a predetermined point of the image to the substantially linear line; and means for arranging the images in a one-dimensional list according to the measured shortest distances.

BRIEF DESCRIPTION OF THE DRAWINGS

Embodiments of the invention are described with reference to the drawings, in which.

DETAILED DESCRIPTION

Figure 1:
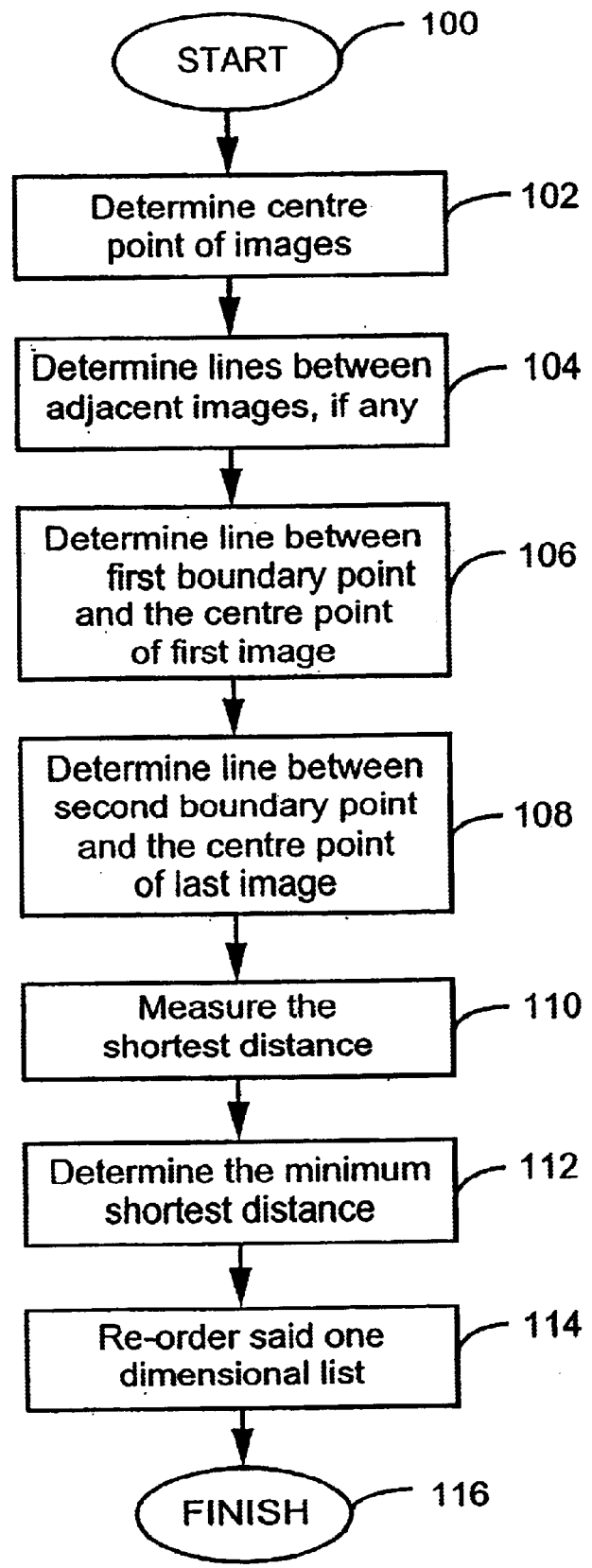
FIG. 1 shows a flow chart of a method of re-ordering a one-dimensional list of a number of images on a page in accordance with a first preferred embodiment.

Where reference is made in any one or more of the accompanying drawings to steps and/or features, which have the same reference numerals, those steps and/or features are for the purposes of this description the same and have the same function(s) or operation(s), unless the contrary intention appears.

First Preferred Embodiment

The first preferred embodiment described herein has general applicability to a method of re-ordering a one-dimensional list of a number of original objects arranged in a space, upon the insertion of a new object in the space. However, for ease of explanation, the steps of the first preferred method are described with reference to a method of reordering a one-dimensional list of a number of original images arranged two-dimensionally on a page upon insertion of a new image on the page. In particular, the first preferred embodiment has application to electronic photo-albums having one or more pages and which are suitable for use on general-purpose computers.

FIG. 1 shows a flow chart of the first preferred method of re-ordering a one-dimensional list of a number of images on a page. The first preferred method is proposed to interface with electronic photo-album software on a general-purpose computer. The electronic photo-album software does not form part of the invention and will not be described in any detail.

The first preferred method commences at step 100. The method is preferably called by the electronic photo-album application when an image is added to the photo-album page. During this step, the location of the insertion point of the new photograph to be added is passed by the electronic photo-album application to the first preferred method.

The electronic photo-album application needs a process for ordering photographs on the page, which ordering is similar to that perceived by people. The first preferred method somewhat matches this ordering. The electronic photo-album application uses this ordered list of photographs and starts placing photographs in the album. The application places photographs from the start of the list on the first page until it runs out of space. It then goes on to the next page and places subsequent photographs there, and so on until all the photographs have been placed on pages.

Figure 2:
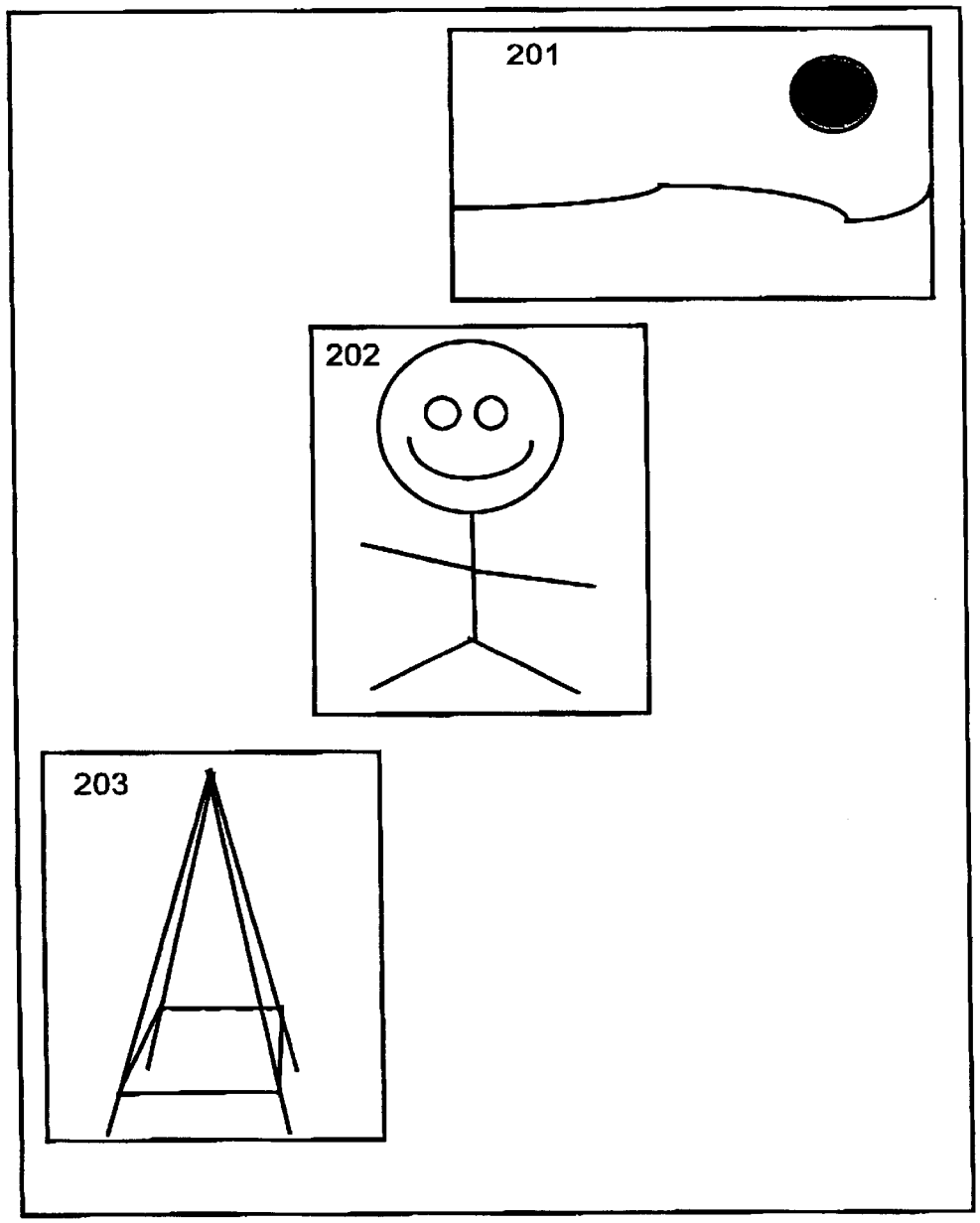
FIG. 2 shows an example of photographs placed on a page of an electronic photo-album.

In the example shown in FIG. 2, the electronic photo-album application has placed the first three photographs 201, 202, and 203 on the first page in accordance with their position in the ordered list of photographs.

The electronic photo-album application allows the user to modify the album after the initial layout. Among other things the user can use the mouse to drag a new photograph onto a page, can delete photographs, or can move photographs around.

The first preferred method preserves an ordered list of the photographs on the page so that if, for example, a new photograph is dragged onto the first page, the first preferred method is called by the electronic photo-album application for updating the ordered list. The first preferred method decides where in the ordered list the new photograph is to be inserted. The first preferred method then returns the updated ordered list to the electronic photo-album application. The photo-album application then knows, for example, which photograph is last on the page and whether it should be pushed onto the next page if there's no longer room on the first page.

Figure 3:
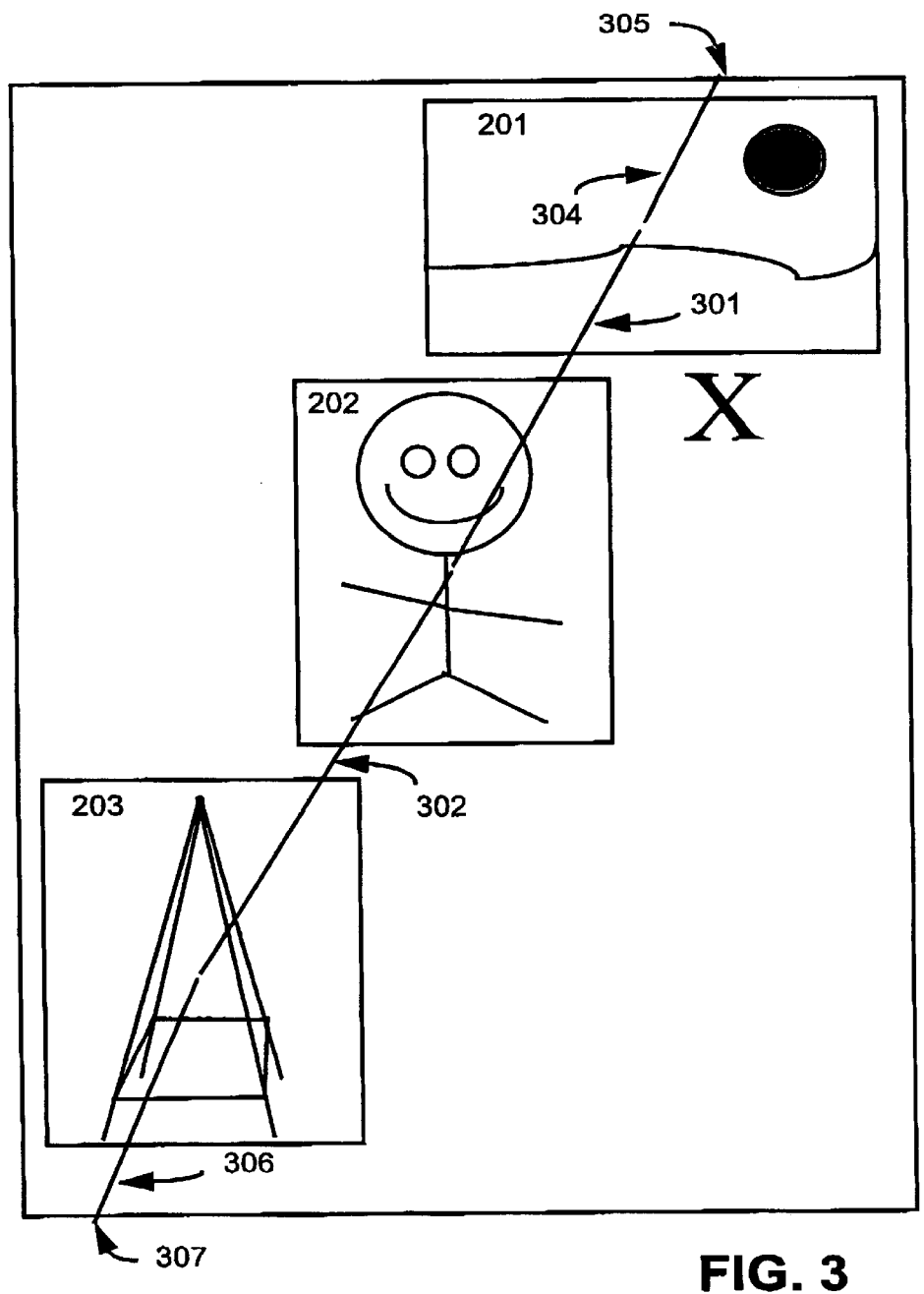
FIG. 3 is similar to FIG. 2 and shows lines connecting the photographs.

Returning to FIG. 1, the first preferred method after commencing proceeds to step 102. In step 102, the first preferred method determines the center points of the one or more original photographs on the page. The term original in this context means those images already existing on the page. Afterwards, the first preferred method calculates in step 104, for each adjacent image, a line between the center points of the adjacent original photographs. Turning now to FIG. 3, there is shown an example of these calculated adjacent lines 301 and 302 between the adjacent photographs 201–202, and 202–203.

Returning now to FIG. 1, the method after step 104 proceeds to steps 106 and 108. In step 106, the first method determines a line between a first boundary point of the page and the center point of the first original image on the page. In step 108, the method similarly determines a line between a second boundary point of the page and the center point of the last original image on the page. Returning to FIG. 3, there is shown an example of the calculated line 304 between first boundary point 305 and the first original photograph 201. There is also shown an example of the calculated line 306 between the second boundary point 307 and the last original photograph 203.

Figure 4:
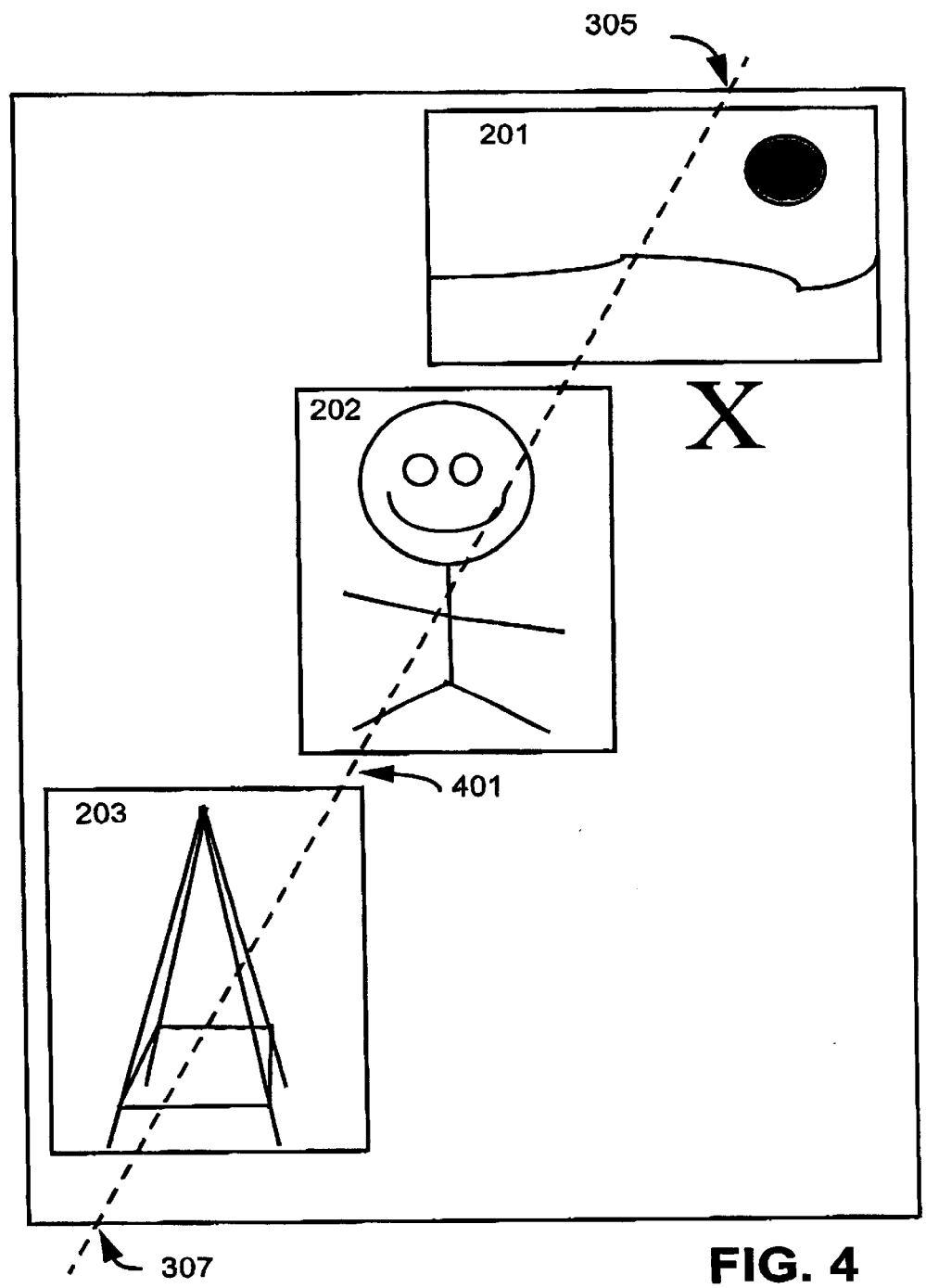
FIG. 4 is similar to FIG. 2 and shows the boundary points.

The first preferred method calculates the position of these boundary points in the following manner. It calculates the angle of a trend line for all the photographs and extends a ray along this line to the edge of the page to determine the first boundary point. The second boundary point is similarly calculated going along the other direction from the last photograph. Turning now to FIG. 4, there is shown an example of the first and second boundary points 305, 307 and a trend line 401. The trend line's angle is found by averaging the x and y coordinates of the first half of the photographs in the ordered list and then averaging the x and y coordinates of the second half of the photographs in the ordered list. The angle of the trend line is the angle of the line that goes through both these points. If there is an odd number of photographs then the middle photograph is included in both average calculations. If the calculated trend points are the same (as when there is only one photograph on the page) then a line extending from the top left of the page to the bottom right of the page is used. This line may also be used a simpler alternative to calculating the trend line.

Returning now to FIG. 1, the first preferred method after the completion of step 108 proceeds to step 110. In this step 110, the first preferred method measures the perpendicular distance from the insertion point to each line. The insertion point X is the center of the newly placed photograph added by the user. In the event, there is no perpendicular distance to a line, the first preferred method measures the distance between the insertion point X and the closest photograph center point in the pair of center points forming that line. Or in other words, the step 110 measures the shortest distance from the insertion point X to each line. During this step 110, the first preferred method also considers the line connecting the above mentioned first boundary point and the center point of the first photograph. In the latter case, the first preferred method also measures the shortest distance from the insertion point X to that line. This allows the user to position a photograph before the first photograph currently on the page. The first preferred method similarly measures the shortest distance from the insertion point X to the line connecting the above mentioned second boundary point and the center of the last of photograph. This similarly allows a user to position a photograph between the last photograph on the page and the second boundary point.

Figure 5:
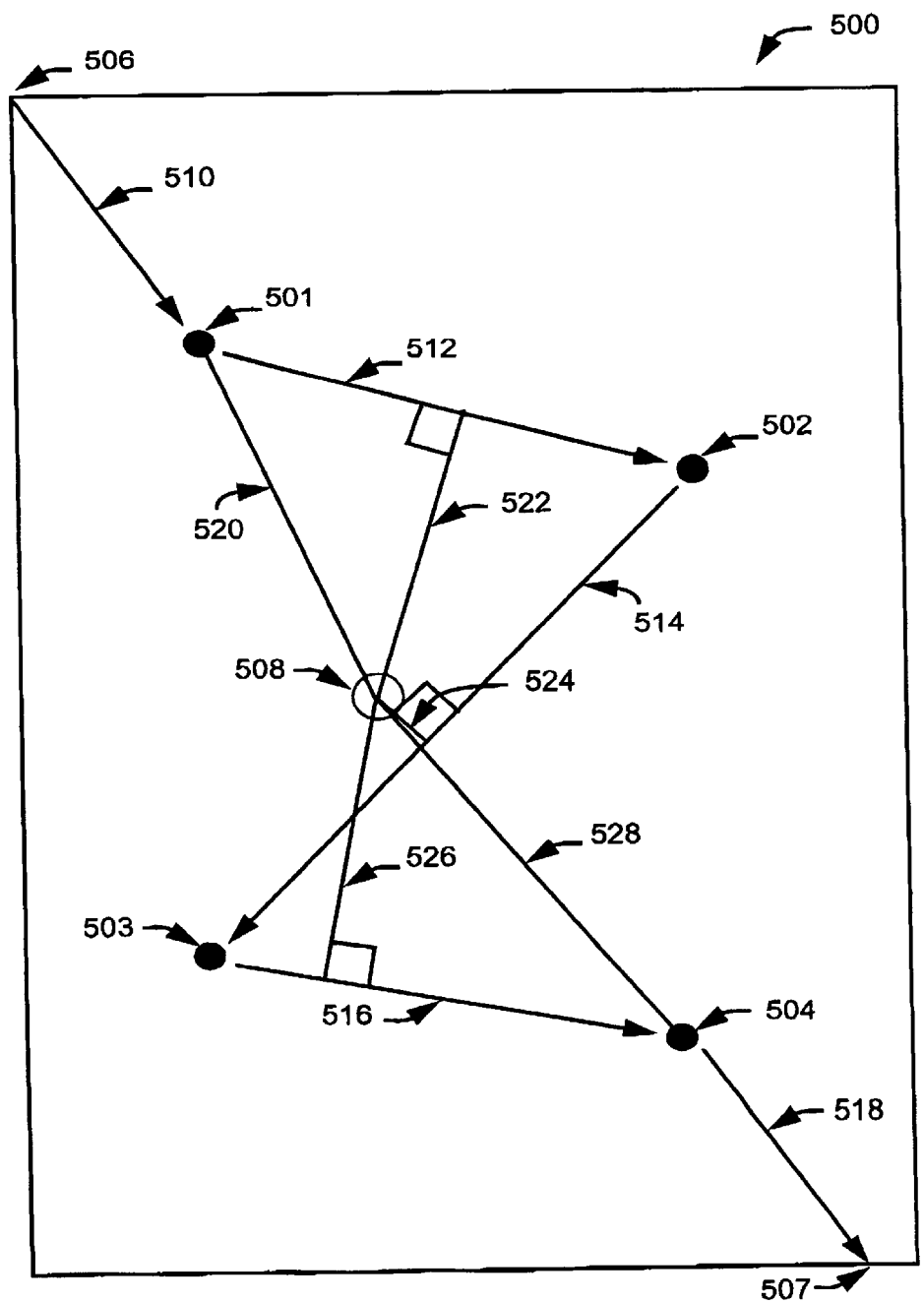
FIG. 5 shows another example of photographs on a page and their connecting lines.

The measuring step 110 of the first preferred method is described in more detail with reference to the example shown. FIG. 5 shows a page 500 of the electronic photo-album having four original photographs 501, 502, 503, and 504, where only the centers of the photographs are shown. The first and second boundary points 506 and 507 are calculated during steps 104 and 106 in the manner described above. In this example, the user has placed a new photograph at an insertion point shown as a circle 508. The insertion point is calculated from the location of the center of the newly placed photograph. In this example, the measuring step 110 measures the shortest distance 520, 522, 524, 526, and 528 from the insertion point 508 to each line 510, 512, 514, 516, and 518 respectively.

Returning to FIG. 1, the first preferred method then proceeds to step 112, where the minimum shortest distance is determined. Afterwards, the first preferred method continues to step 114, where the list of the original photographs is updated. The newly placed photograph is inserted in the list of the original photographs between those photographs, or photographs and boundary points, which are joined by a line where the measured shortest distance to that line is the minimum amongst all measured shortest distances. Returning to FIG. 5, the re-ordering is described with reference to the example shown. In this example, the original order of the photographs is 501, 502 503, and 504. As can be seen, the minimum shortest distance is the shortest distance 524 from the insertion point 508 to line 514 connecting photographs 502 and 503. Thus new photograph P is inserted in the list between the photographs 502 and 503 resulting in the following re-ordered list 501, 502, P, 503, and 504.

Returning to FIG. 1, after completion of step 114, the method terminates at 116 and returns the new list of photographs to the electronic photo-album application. Thus in this manner, given a set of points on a plane that have a one-dimensional ordering, the first preferred method automatically determines changes to that ordering using the positions of inserted or moved points. The first preferred method has the property that is does not presuppose that the points are arranged in any particular direction (such as down a page), but rather extends the existing order. Thus, initially a first photograph may be added to a blank page, say for example at the center, and the first preferred method then may add incrementally new photographs to the ordered list.

Preferably, if the position of a new photograph is such that it would be the last photograph on the page and would not fit on the page, then it is considered that it is actually the second last photograph, so that the previously last photograph is pushed onto the next page. Furthermore, when a photograph is deleted it is simply removed from tie ordered list so that the photograph before it is now adjacent to the photograph after it. When photographs are moved then the new position for the photograph in the ordered list is determined as for a new photograph except that the photograph is removed from its old position in the ordered list after it has been inserted into its new position. That is, its current position is taken into account when measuring distances and deciding its new position.

It would be apparent to a person skilled in the art that modifications and/or changes can be to the flow control of the first preferred method without departing from the scope and spirt of the invention. For instance, the processing of steps 102, 104 and 106 may be inter-changed in any order. Furthermore, the processing may be undertaken either sequentially or in parallel.

The embodiment may also have application in the re-ordering of a one-dimensionally list of objects, which have been arranged in a n-dimensional space, such as 3-dimensional graphics.

Second Preferred Embodiment

The second preferred embodiment described herein has general applicability to a method of determining a one-dimensional order of a plurality of objects arranged two-dimensionally. However, for ease of explanation, the steps of the second preferred method are described with reference to a method of determining a one-dimensional order of a plurality of images on a page. The described second preferred method has particular application to electronic photo-albums suitable for use on general-purpose computers.

Figure 6:
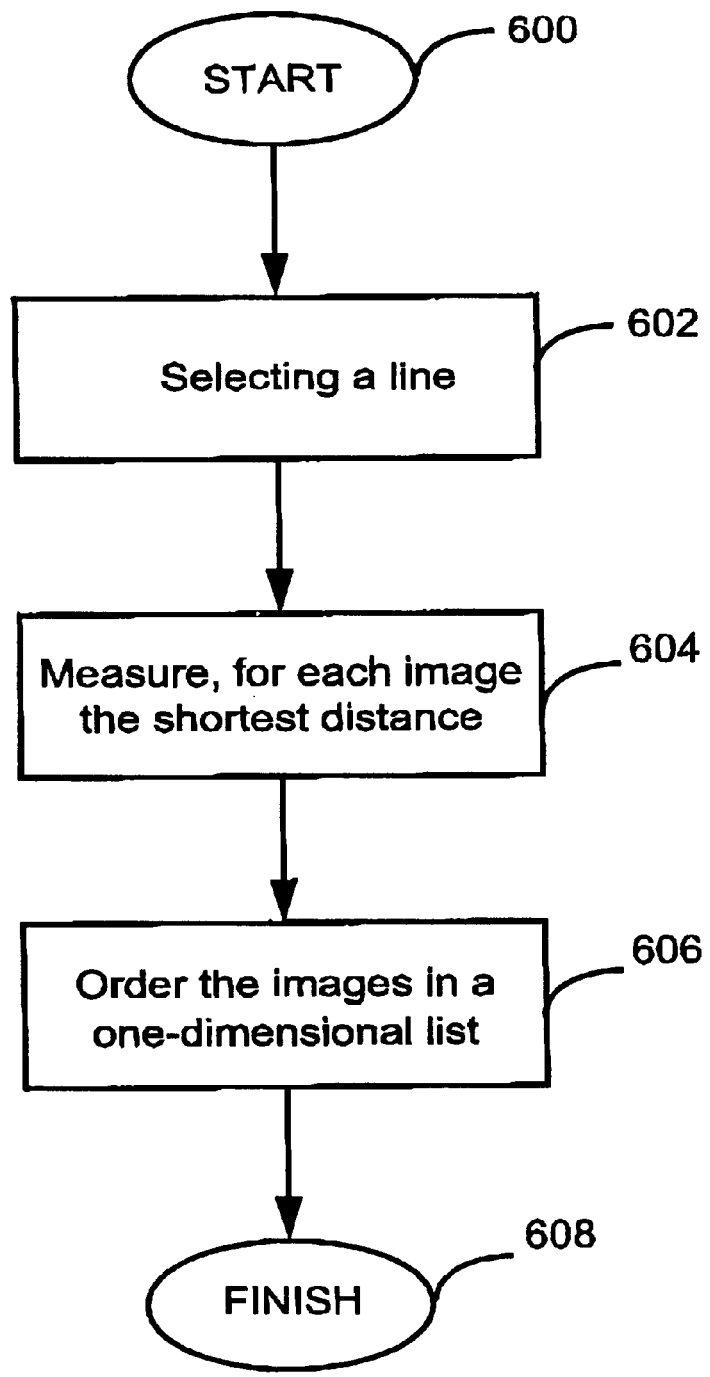
FIG. 6 shows a flow chart of a method of determining a one-dimensional order of a plurality of images arranged two-dimensionally on a page in accordance with a second preferred embodiment.

FIG. 6 shows a flow chart of a method of determining a one-dimensional order of a plurality of images arranged two-dimensionally on a page in accordance with the second preferred embodiment. The second preferred method may interface with conventional electronic photo-album software on a general-purpose computer. The second preferred method commences at step 600. The method is preferably called by the electronic photo-album application when one or more images are added to a new photo-album page.

Figure 7:
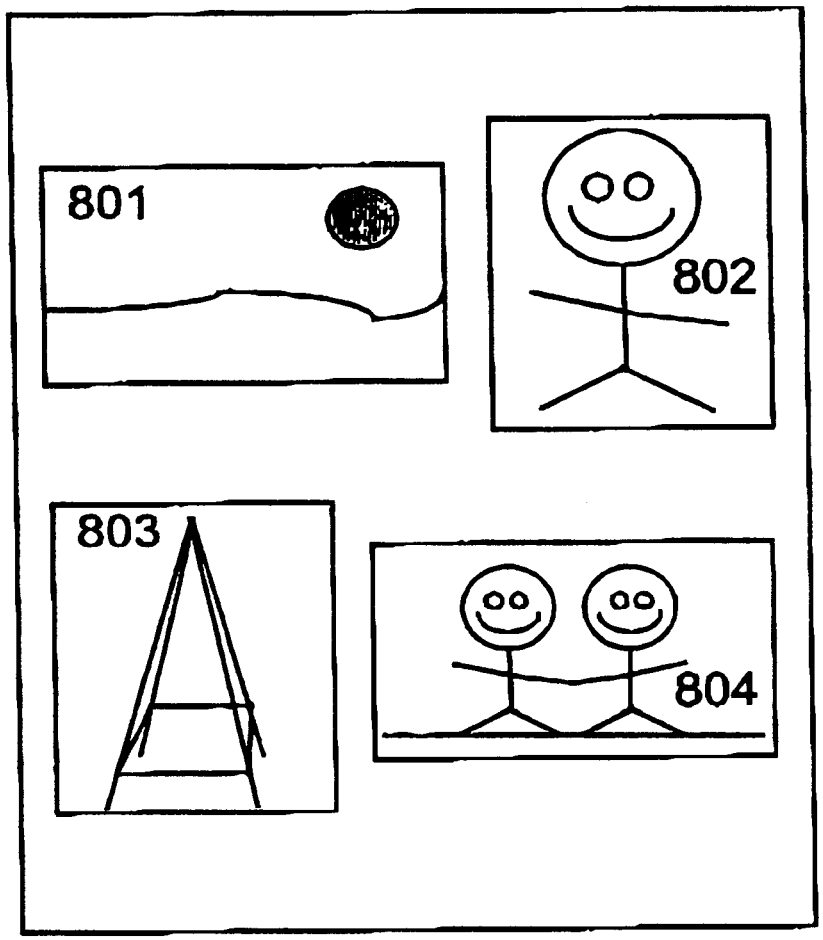
FIG. 7 shows an example of an arrangement of a number of photographs added to a page of an electronic photo-album.

Turning now to FIG. 7, there is shown an example of an arrangement of a number of photographs added to a page of an electronic photo-album. The second preferred method may also be called when one or more photographs are added or deleted or re-arranged on the photo-album page.

The electronic photo-album application needs a flexible process of ordering photographs on the page, which is achieved by the second preferred method. This enables the electronic photo-album application to utilize this ordered list of photographs, when the user further arranges the photo-album. For example, the electronic photo-album application will push the last photograph on to the next page when a new photograph is inserted, or pull the first photograph from the next page when a photograph is deleted Returning to FIG. 6, the second preferred method continues at step 602, where a user may select a line to be used in the subsequent measuring step 604. The selection of a particular line will effect the ordering of the photographs and thus the user may impart his or her own bias to the ordering. Alternatively, this step 602 may be deleted and the line's orientation be preset and fixed. As can be seen, the line is determined prior to the measuring step. After step 602, the method continues at the measuring step 604.

Figure 8:
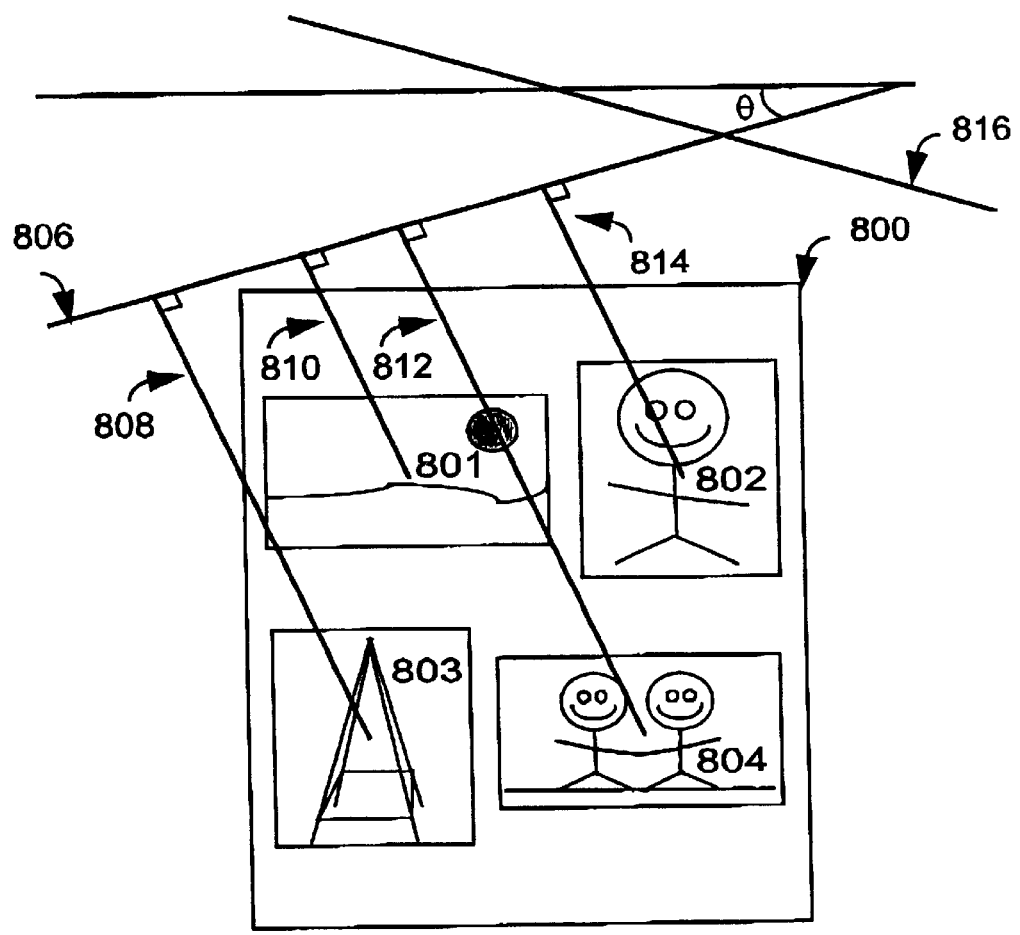
FIG. 8 shows an example of the measurement step 604 of FIG. 6 in more detail.

In step 604, the second preferred method measures, for each photograph on the page, the shortest distance from the center of the photograph to the selected line. FIG. 8 shows an example of the measuring step 604 of FIG. 6 in more detail. The photo-album page 800 is displayed on a computer monitor (not shown). The page 800 contains four photographs 801, 802 803, and 804 arranged two-dimensionally on the page. The selected line 806 from step 602 is used as the base line for the measuring step 604. The measuring step 604 determines for each photograph 801, 802, 803, and 804, the shortest distance 808, 810, 812, and 814 from the center of the photograph to the selected line 806. Namely, the perpendicular distance from the line 806 to the center of the photograph. Alternatively, the method may measure the shortest distance from a predetermined corner of the photographs, such as the top left hand corner. After the completion of the measuring step, the second preferred method proceeds to the ordering step 606.

Returning to FIG. 6, the second preferred method in step 606 determines a one dimensional order of the images on the page according to the measured shortest distance. For example, the photographs are placed in an order in a list in accordance with increasing measured shortest distances. Alternatively, the photographs may be placed in an order of decreasing measured shortest distances. In the example shown in FIG. 8, the photographs 801, 802, 803, and 804 are ordered in step 606 in the following order 801, 802, 803, and 804 in accordance with the increasing measured distances. A different selected line, for example line 816, may result in a different order of the photographs. In the latter case, the order of the photographs is 802, 801, 804, and 803. After the completion of the ordering step 606, the method terminates at step 608 and is returned to the photo-album application.

As mentioned previously, a user may select the orientation of the line. Alternatively, the sign and angle can be preset and fixed to suit the typical culture of a user. For example, a shallow positive angle of $\theta$ as shown in FIG. 8 will suit cultures that read words from left to right and then lines from top to bottom. This is due to the fact that in such cultures reading starts at the top left of each page and finishes at the bottom right, and vertical position is a stronger indication of precedence than horizontal position. Alternative orientations of the line may suit other cultures, such as Arabic countries, which read from right to left. Preferably, the line is positioned outside the page and is closest to those photographs desired to be first in the order. Whilst it is preferable the line is straight, in some circumstances a curved line may be desirable.

In a still further embodiment, the preferred method may determine a one-dimensional order of a plurality of objects arranged N-dimensionally, where N is greater than or equal to 2. In this embodiment, the measuring step measures, for each object, the shortest distance from the centre point of an object to a predetermined N−1 dimensional surface. In one particular application, the method may be used in a 3-D graphics system wherein the objects are arranged 3-dimensionally, such as in a virtual reality system.

It would be apparent to a person skilled in the art that modifications and/or changes can be made to the flow control of the second preferred method without departing from the scope and spirit of the invention. For instance, the shortest distances may be measured in parallel, rather than in sequence.

Preferred Embodiment of Apparatus(s)

Figure 9:
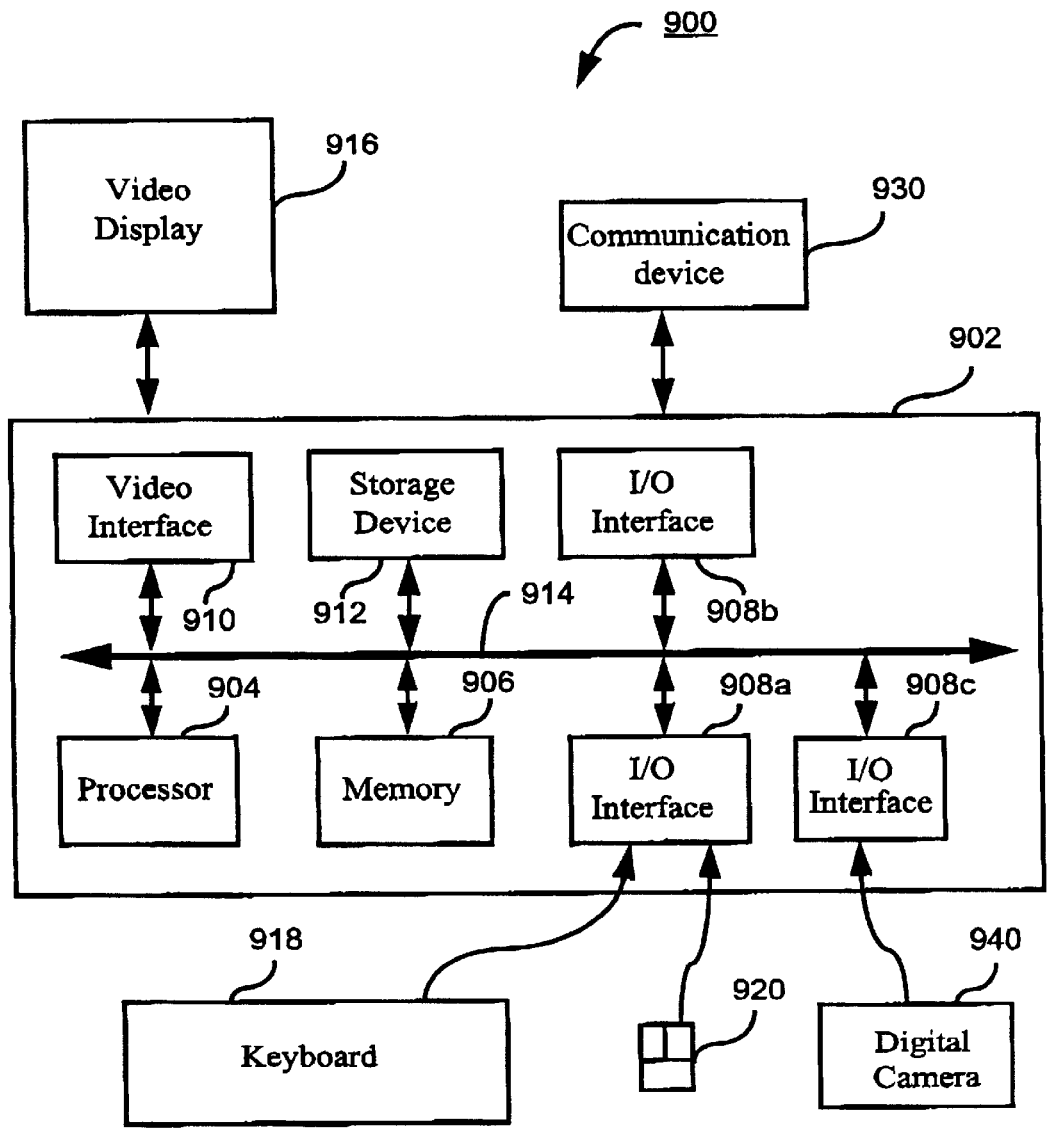
FIG. 9 is a block diagram of a general-purpose computer.

The method of re-ordering is preferably practiced using a conventional general-purpose computer, such as the one shown in FIG. 9 wherein the processes of FIG. 1 may be implemented as software executing on the computer. In particular, the steps of method of re-ordering are effected by instructions in the software that are carried out by the computer. The software may be divided into two separate parts; one part for carrying out the re-ordering method; and the other part the electronic photo-album application. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for re-ordering in accordance with the embodiments of the invention.

The computer system 900 consists of the computer 902, a video display 916, and input devices 918, 920. In addition, the computer system 900 can have any of a number of other output devices including line printers, laser printers, plotters, and other reproduction devices connected to the computer 902, The computer system 900 can be connected to one or more other computers via a communication interface 908b using an appropriate communication channel 930 such as a modem communications path, a computer network, or the like. The computer network may include a local area network (LAN), a wide area network (WAN), an Intranet, and/or the Internet The computer 902 itself consists of a central processing unit(s) (simply referred to as a processor hereinafter) 904, a memory 906 which may include random access memory (RAM) and read-only memory (ROM), input/output (IO) interfaces 908a, 908b & 908c, a video interface 910, and one or more storage devices generally represented by a block 912 in FIG. 9, The storage device(s) 912 can consist of one or more of the following: a floppy disc, a hard disc drive, a magneto-optical disc drive, CD-ROM, magnetic tape or any other of a number of non-volatile storage devices well known to those skilled in the art. Each of the components 904 to 912 is typically connected to one or more of the other devices via a bus 914 that in turn can consist of data, address, and control buses.

The video interface 910 is connected to the video display 916 and provides video signals from the computer 902 for display on the video display 916. User input to operate the computer 902 can be provided by one or more input devices 908b. For example, an operator can use the keyboard 918 and/or a pointing device such as the mouse 920 to provide input to the computer 902.

The images used in the preferred method may be produced by a digital camera 940 and downloaded to the electronic photo-album application with the I/O interface 908c. Alternatively, the images may be scanned by an electronic scanner (not shown), downloaded from the Internet, or downloaded from a floppy or CD disk.

The system 900 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 912 in FIG. 9) as the computer readable medium, and read and controlled using the processor 904. Intermediate storage of the program and pixel data and any data fetched from the network may be accomplished using the semiconductor memory 906, possibly in concert with the hard disk drive 912.

In some instances, the program may be supplied to the user encoded on a CD-ROM or a floppy disk (both generally depicted by block 912), or alternatively could be read by the user from the network via a modem device connected to the computer, for example. Still further, the software can also be loaded into the computer system 900 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of determining a one-dimensional order of a plurality of images may also be preferably practiced using the conventional general-purpose computer, such as the one shown in FIG. 9 wherein the processes of FIG. 6 may be implemented as software executing on the computer. In particular, the steps of method of determining the order of the images are effected by instructions in the software that are carried out by the computer. The software may be divided into two separate parts; one part for carrying out the method of FIG. 6; and another part to a conventional electronic photo-album interfacing the latter. The software may also be stored in a computer readable medium, including the storage devices described below, for example, The software is loaded into the computer from the computer readable medium, and then executed by the computer. A computer readable medium having such software or computer program recorded on it is a computer program product. The use of the computer program product in the computer preferably effects an advantageous apparatus for determining the order of the images in accordance with the embodiments of the invention.

The preferred methods may alternatively be implemented in dedicated hardware such as one or more integrated circuits performing the functions or sub functions of the method. Such dedicated hardware may include graphic processors, digital signal processors, or one or more microprocessors and associated memories.

The foregoing only describes a small number of embodiments of the present invention, however, modifications and/or changes can be made thereto without departing from the scope and spirit of the invention. The present embodiments are, therefore, to be considered in all respects to be illustrative and not restrictive.

We claim:

1. A method of re-ordering a one-dimensional list of a number of original objects arranged in a space, upon the insertion of a new object in the space, the method comprising:
   (i) determining, for each adjacent original object if any, a corresponding line between points of the adjacent original objects;
   (ii) measuring, for each said line, the shortest distance from an insertion point of the new object to the said line;

(iii) determining the minimum of the shortest distances; and (iv) re-ordering said one-dimensional list by inserting the new object in said list of original objects at that position in the list corresponding to that line having the minimum shortest distance.

2. A method as claimed in claim 1, wherein the objects are arranged in a two-dimensional space.

3. A method as claimed in claim 1, wherein the objects are arranged in a three-dimensional space.

4. A method as claimed in claim 1, wherein the said step (i) comprises the sub-steps of:
   (i)(a) determining a corresponding line between a first boundary point surrounding the objects and said point of a first said original object;
   (i)(b) determining a corresponding line between a second boundary point surrounding the objects and said point of a last said original object; and
   (i)(c) determining, for each adjacent original object if any, a corresponding line between points of the adjacent original objects.

5. A method as claimed in claim 1 or 4, wherein said points of the objects are the center points.

6. A method as claimed in claim 1, wherein when an original object is moved to a new position in the space, the moved original object is treated as the new object and the old position of the original object that was moved is taken into account when re-ordering the list.

7. A method as claimed in claim 1, wherein said measuring step comprises the sub-steps of:
   (ii)(a) measuring, for each line, the perpendicular distance from the insertion point to said line; and if there is no perpendicular distance for that line
   (ii)(b) measuring the distance between the insertion point and the closest point of the pair of end points forming said line.

8. A method of re-ordering a one-dimensional list of a number of original images arranged two-dimensionally on a page, upon the insertion of a new image on the page, the method comprising:
   (i) determining, for each adjacent original images if any, a corresponding line between points of the adjacent original images;
   (ii) determining a corresponding line between a first boundary point of the page and a said point of the first original image on the page;
   (iii) determining a corresponding line between a second boundary point of the page and a said point of the last original image on the page;
   (iv) measuring, for each said line, the shortest distance from an insertion point of the new image on the page to the said line;
   (v) determining the minimum of the shortest distances; and
   (vi) re-ordering said one-dimensional list by inserting the new image in said list of original images at that position in the list corresponding to that line having the minimum shortest distance.

9. A method as claimed in claim 8, wherein when an original image is moved to a new position on the page, the moved original image is treated as the new image and the old position of the original image that was moved is taken into account when re-ordering the list.

10. A method as claimed in claim 8, wherein the said points are center points and the method further comprises, prior to step (i), the following step:
   (a) determining the center points of the one or more original images.

11. A method as claimed in claim 8, wherein the first and second boundary points are determined by
   (a) averaging the x and y co-ordinates of the center points of a first half of the original images to determine a first point;
   (b) averaging the x and y co-ordinates of the center points of a second half of the original images to determine a second point;
   (c) generating a trend line between the first and second points; and
   (d) generating the said first and second boundary points as those points on the boundary of the page which intersect the trend line.

12. A method as claimed in claim 11, wherein if there are an odd number of original images, then said first half and second half of original images comprise a middle image.

13. A method as claimed in claim 11, wherein if said first and second points are the same, then the trend line is generated from the top left of the page to the bottom right of the page.

14. A method as claimed in claim 11, wherein if said first and second points are the same, then the trend line is generated from the top right of the page to the bottom left of the page.

15. A method as claimed in claim 8, wherein if an image is deleted from a page, it is removed from the ordered list, whereby the image before it is now adjacent to the image after it.

16. A method as claimed in claim 8, wherein said measuring step comprises the sub-steps of:
   (ii)(a) measuring, for each line, the perpendicular distance from the insertion point to said line; and if there is no perpendicular distance for that line
   (ii)(b) measuring the distance between the insertion point and the closest point of the pair of points forming said line.

17. An apparatus for re-ordering a one-dimensional list of a number of original objects arranged in a space, upon the insertion of a new object in the space, the apparatus comprising:
   means for determining, for each adjacent original object if any, a corresponding line between points of the adjacent original objects;
   means for measuring, for each said line, the shortest distance from an insertion point of the new object to the said line;
   means for determining the minimum of the shortest distances; and
   means for re-ordering said one-dimensional list by inserting the new object in said list of original objects at that position in the list corresponding to that line having the minimum shortest distance.

18. An apparatus for re-ordering a one-dimensional list of a number of original images arranged two-dimensionally on a page upon the insertion of a new image on the page, the apparatus comprising:
   means for determining, for each adjacent original images if any, a corresponding line between points of the adjacent original images;
   means for determining a corresponding line between a first boundary point of the page and the centre point of the first original image on the page;
   means for determining a corresponding line between a second boundary point and the centre point of the last original image on the page;

means for measuring, for each said line, the shortest distance from an insertion point of the new image on the page to the said line;

means for determining the minimum of the shortest distances; and means for re-ordering said one-dimensional list by inserting the new image in said list of original images at that position in the list corresponding to that line having the minimum shortest distance.

19. A computer program product including a computer readable medium having recorded thereon a computer program for re-ordering a one-dimensional list of a number of original objects arranged in a space, upon the insertion of a new object in the space, the computer program product comprising:

means for determining, for each adjacent original object if any, a corresponding line between points of the adjacent original objects;

means for measuring, for each said line, the shortest distance from an insertion point of the new object to the said line;

means for determining the minimum of the shortest distances; and means for re-ordering said one-dimensional list by inserting the new object in said list of original objects at that position in the list corresponding to that line having the minimum shortest distance.

20. A computer program product including a computer readable medium having recorded thereon a computer program for re-ordering a one-dimensional list of a number of original images arranged two-dimensionally on a page upon the insertion of a new image on the page, the computer program product comprising:

means for determining, for each adjacent original images if any, a corresponding line between points of the adjacent original images;

means for determining a corresponding line between a first boundary point of the page and the centre point of the first original image on the page;

means for determining a corresponding line between a second boundary point and the centre point of the last original image on the page;

means for measuring, for each said line, the shortest distance from an insertion point of the new image on the page to the said line;

means for determining the minimum of the shortest distances; and means for re-ordering said one-dimensional list by inserting the new image in said list of original images at that position in the list corresponding to that line having the minimum shortest distance.

21. A method of determining a one-dimensional order of a plurality of objects arranged N-dimensionally, where N is greater than or equal to 2 and the method comprises the following steps:

measuring, for each said object, the shortest distance from a predetermined point of the object to a predetermined N−1 dimensional surface; and determining a one-dimensional order of said objects according to the measured shortest distances.

22. A method as claimed in claim 21, wherein N is equal to two and the predetermined N−1 dimensional surface is a predetermined line.

23. A method as claimed in claim 22, wherein said method further comprises, prior to the measuring step:

selecting said predetermined line according to user input.

24. A method as claimed in claim 22, wherein the predetermined line is straight.

25. A method as claimed in claim 21, wherein the predetermined point is the centre of the object.

26. A method as claimed in claim 23, wherein the selecting step comprises selecting the sign and angle of the predetermined line.

27. A method as claimed in claim 21, wherein said objects are images arranged two-dimensionally on a page.

28. A method as claimed in claim 22, wherein the predetermined line is positioned in such a manner that the smallest measured shortest distance will correspond to a said image in the top left corner of the page.

29. A method of forming a one-dimensional list of a plurality of images arranged two-dimensionally on a page, the method comprising the following steps of:

selecting a substantially linear line according to user input;

measuring, for each said image, the shortest distance from a predetermined point of the image to the substantially linear line; and arranging the images in a one-dimensional list according to the measured shortest distances.

30. An apparatus for determining a one-dimensional order of a plurality of objects arranged two-dimensionally, the apparatus comprising:

means for measuring, for each said object, the shortest distance from a predetermined point of the object to a predetermined line; and means for determining a one-dimensional order of said objects according to the measured shortest distances.

31. An apparatus for forming a one-dimensional list of a plurality of images arranged two-dimensionally on a page, the apparatus comprising:

means for selecting a substantially linear line according to user input;

means for measuring, for each said image, the shortest distance from a predetermined point of the image to the substantially linear line; and means for arranging the images in a one-dimensional list according to the measured shortest distances.

32. A computer program product including a computer readable medium having recorded thereon a computer program for determining a one-dimensional order of a plurality of objects arranged two-dimensionally, the computer program product comprising:

means for measuring, for each said object, the shortest distance from a predetermined point of the object to a predetermined line; and means for determining a one-dimensional order of said objects according to the measured shortest distances.

33. A computer program product including a computer readable medium having recorded thereon a computer program for forming a one-dimensional list of a plurality of images arranged two dimensionally on a page, the computer program product comprising:

means for selecting a substantially linear line according to user input;

means for measuring, for each said image, the shortest distance from a predetermined point of the image to the substantially linear line; and means for arranging the images in a one-dimensional list according to the measured shortest distances.

* * * * *

UNITED STATES PATENT AND TRADEMARK OFFICE
CERTIFICATE OF CORRECTION

PATENT NO. : 6,782,141 B1
DATED : August 24, 2004
INVENTOR(S) : Nicolas Leslie Coleman et al.

It is certified that error appears in the above-identified patent and that said Letters Patent is hereby corrected as shown below:

Title page,
Item [75], Inventors, "Scott T. Newham, New South Wales (AU)" should read -- Scott T. Newham, Balmain (AU) --.

Column 5,
Line 30, "original" should read -- 'original' --.

Column 6,
Line 3, "used a" should read -- used as a --;
Line 24, "of" (second occurrence) should be deleted; and
Line 40, "and 518" should read -- and 518, --.

Column 7,
Line 10, "tie" should read -- the --;
Line 22, "spirt" should read -- spirit --;
Line 27, "one-dimensionally" should read -- one-dimensional --;
Line 28, "a" should read -- an --; "n-dimensional" should read -- N-dimensional --; and
Line 64, "deleted" should read -- deleted. --.

Column 9,
Line 5, "Apparatus(s)" should read -- Apparatus(es) --;
Line 28, "902," should read -- 902. --;
Line 34, "Internet" should read -- Internet. --; and
Line 40, "FIG. 9," should read -- FIG. 9. --.

Column 11,
Line 19, "object" should read -- object, --; and
Line 41, "images"should read -- images, --.

Column 12,
Line 42, "object" should read -- object, --; and
Line 58, "images" should read -- images, --.

UNITED STATES PATENT AND TRADEMARK OFFICE
CERTIFICATE OF CORRECTION

PATENT NO. : 6,782,141 B1
DATED : August 24, 2004
INVENTOR(S) : Nicolas Leslie Coleman et al.

It is certified that error appears in the above-identified patent and that said Letters Patent is hereby corrected as shown below:

Column 13,
Line 16, "object" should read -- object, --; and
Line 33, "images" should read -- images, --.

Signed and Sealed this

Twenty-sixth Day of July, 2005

JON W. DUDAS
*Director of the United States Patent and Trademark Office*